U. WYNN.
Wagon-Couplings.
No. 135,742. Patented Feb. 11, 1873.
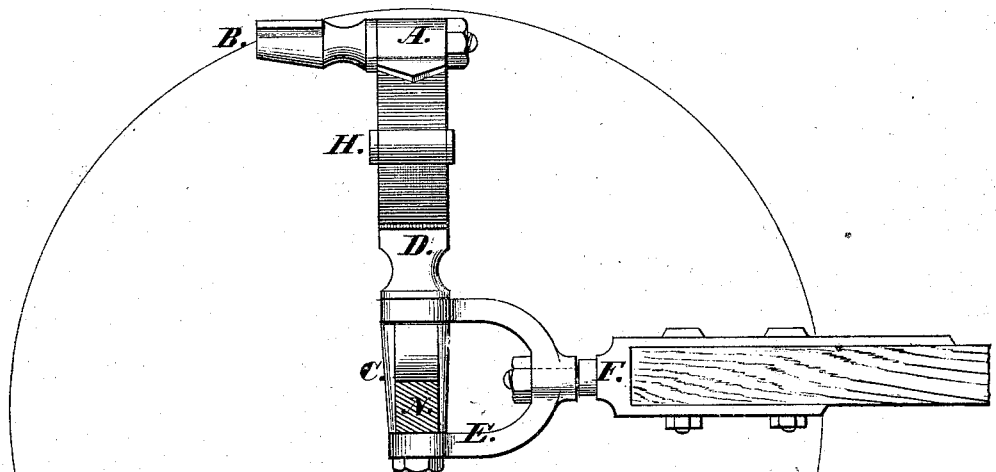
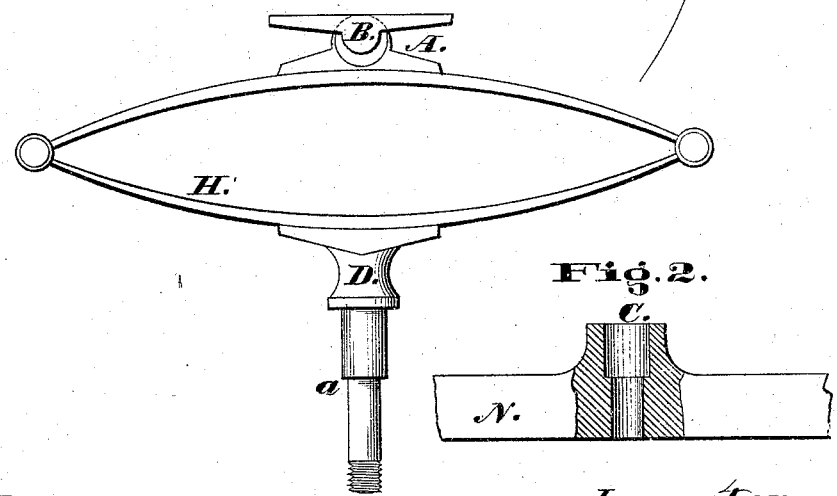
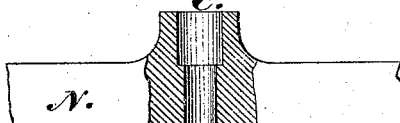
Witnesses.
Wm. L. Patterson
Sidney West.
Inventor.
Ulysses Wynn.

UNITED STATES PATENT OFFICE.

ULYSSES WYNN, OF STERLING, ILLINOIS, ASSIGNOR OF THREE-FOURTHS HIS RIGHT TO WILLIAM L. PATTERSON AND JOHN G. MANAHAN, OF SAME PLACE.

IMPROVEMENT IN WAGON-COUPLINGS.

Specification forming part of Letters Patent No. 135,742, dated February 11, 1873.

*To all whom it may concern:*

Be it known that I, ULYSSES WYNN, of Sterling, in the county of Whitesides and State of Illinois, have invented certain Improvements in Carriage and Wagon Couplings, of which the following is a specification:

The invention relates to providing a method of so connecting the rear and forward axles of a four-wheeled vehicle, wagon, or carriage, as to dispense with the ordinary head-block and fifth-wheel or slider and yet better accomplish the purposes for which those parts are designed.

Figure 1 is a side elevation of the front carriage of a four-wheeled vehicle embodying my invention. Fig. 2 is a longitudinal section of the socket C, showing the flange $a$ extending around the inner surface of the socket at a point therein on a level with the top of the axle N. Fig. 3 is the king-bolt D.

N is the ordinary iron axle, provided at its center with the socket C having the flange $a$. This socket is made by giving the axle at that point a swell on both sides and an extension upward. The axle may be used all iron, or may be overlaid with wood on either side of the socket C; and the socket may be used on a wooden axle by giving it shoulders or bearings laterally on the top of the axle; and the flange $a$ may be made at any point in or on the socket C, if the shoulder of the king-bolt D be correspondingly changed. D is the king-bolt, provided with two shoulders, the upper one of which is placed over the top of the clevis E, and the second one rests upon the flange $a$ in the socket C. The bolt D has also a laterally-elongated head with a concave top to receive the spring H, or a bolster, thus being a substitute for the ordinary head-block. This head may extend under the spring H any desired length; but about one-fifth of the distance from the center of the bolt to the end of the spring will be found to operate satisfactorily. This king-bolt extends down through the clevis E and socket C, and through the lower end of the clevis, and is furnished with a thread and nut at the lower end, and a third, nearly imperceptible, shoulder on the inside of the nut. This bolt is made of sufficient length to bring the front of the body of the vehicle to a level with its rear end, and of different diameters to give the strength required in each instance, my rule being to make the diameter of the bolt above the second shoulder that of the spindles at their collar. The shoulders are so located upon the bolt D that the entire weight upon the bolt rests on the flange $a$ and no part of it upon the top of the clevis E, thus allowing the latter to play freely. E is the clevis provided with a loop or round hole at each end. The larger hole is placed over the upper end of the socket C and the smaller hole under the socket and underneath the axle. The clevis has also a round hole at its apex, into which the prolongation of the reach F is inserted and rotates, thus forming a swivel-joint. B is a body-loop, which is placed under and supports the fore end of the body or box of the vehicle, and is inserted into and rotates in the horizontal socket A, which latter is fastened on the top of the center of the spring H, the body-loop B being secured therein by the nut on the front end, and forming, in connection with the socket A, a horizontal swivel. This swivel can be used without the spring by being placed upon an ordinary bolster, or upon the head of the bolt D. The body or box of the vehicle may be placed sufficiently forward over the body-loop B to cover the spring H, and the socket A may be placed under the top of the spring. H represents the ordinary spring. The flange $a$ in the socket C is from one-fourth to one-half an inch in width, according to the weight of the vehicle; and the orifice in the socket C is of a size to snugly fit the king-bolt D throughout the length of the socket, and yet allow the bolt to turn freely in the socket. The socket C is provided above the flange $a$ with an oil-hole, as are also both swivels.

The advantages of my invention are as follows: It greatly strengthens the weak place in the vehicle without increasing its weight. In this invention the body of the vehicle maintains a level position regardless of the position of the front wheels and axle. Each axle may rock independent of the other, and also each wheel may rise and fall without binding or cramping the gearing or body. By giving greater leverage on the pivotal point at flange

*a* the vehicle is guided and turned with less effort. The wheels will more readily adjust themselves to the line of draft. By this respective freedom of the axles all cramping or twisting of the springs is avoided, and the pressure upon the forward spring, either in persons getting into the vehicle or in the rocking of the front axle, is always perpendicularly downward through the spring. It secures more ease and comfort in riding by preventing the front axle from communicating its rocking motion to the body of the vehicle. It dispenses with the ordinary fifth-wheel and head-block with their numerous bolts, nuts and rivets, likely to become loose, the king-bolt D, in connection with the flange *a*, being a head-block, king-bolt, and fifth-wheel in one piece; or, in other words, the invention is a simple strong substitute for the weak complex part of the vehicle, a part intricate in its construction and difficult to keep in repair.

I claim as my invention—

The combination of the socket A, body-loop B, socket C, king-bolt D, and clevis E, in connection with the spring H or other connecting device, all constructed and operating together substantially as described, as and for the purposes specified.

ULYSSES WYNN.

Witnesses:
    WM. L. PATTERSON,
    SIDNEY WEST.